United States Patent
Hernandez-Sherrington et al.

(10) Patent No.: US 10,338,901 B2
(45) Date of Patent: *Jul. 2, 2019

(54) TRANSLATION OF A VISUAL REPRESENTATION INTO AN EXECUTABLE INFORMATION EXTRACTION PROGRAM

(71) Applicant: International Business Machines Corporation, Armonk, NY (US)

(72) Inventors: Mauricio Antonio Hernandez-Sherrington, Gilroy, CA (US); Jayatheerthan Krishnamurthy, Bangalore (IN); Yunyao Li, San Jose, CA (US); Ramiya Venkatachalam, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,168

(22) Filed: Jan. 5, 2018

(65) Prior Publication Data

US 2018/0129487 A1 May 10, 2018

Related U.S. Application Data

(63) Continuation of application No. 15/006,985, filed on Jan. 26, 2016, now Pat. No. 9,886,250.

(51) Int. Cl.
*G06F 9/44* (2018.01)
*G06F 8/41* (2018.01)
(Continued)

(52) U.S. Cl.
CPC .............. *G06F 8/41* (2013.01); *G06F 8/34* (2013.01); *G06F 16/00* (2019.01)

(58) Field of Classification Search
CPC ........................................................ G06F 8/41
(Continued)

(56) References Cited

U.S. PATENT DOCUMENTS

| | | | |
|---|---|---|---|
| 7,581,170 | B2 | 8/2009 | Baumgartner et al. |
| 7,890,533 | B2 | 2/2011 | Pollara |

(Continued)

OTHER PUBLICATIONS

Vu Le et al., "FlashExtract: A Framework for Data Extraction by Examples", ACM, Jun. 2014, pp. 542-553 (Year: 2014).*

(Continued)

*Primary Examiner* — Wei Y Zhen
*Assistant Examiner* — Lanny N Ung
(74) *Attorney, Agent, or Firm* — Ference & Associates LLC

(57) ABSTRACT

One embodiment provides a method including: receiving input indicating at least one concept from at least one document of an input document collection; generating a validated data model for each of a plurality of concepts, wherein each of the concepts is represented as a visual data structure comprising semantics; generating at least one intermediate model object by parsing the validated data model, wherein each of the intermediate model objects comprises a concept object and the at least one intermediate model object identifies concept dependencies; translating the at least one intermediate model object into executable source code by importing at least one pre-built extractor and translating at least one rule identified from the visual data structure; and generating an executable information extraction program from the executable source code, wherein the generating comprises generating at least one rule for the executable information extraction program based on the identified concept dependencies.

20 Claims, 8 Drawing Sheets

(51) Int. Cl.
*G06F 8/34* (2018.01)
*G06F 16/00* (2019.01)

(58) Field of Classification Search
USPC .......................................................... 717/106
See application file for complete search history.

(56) References Cited

U.S. PATENT DOCUMENTS

| | | | | |
|---|---|---|---|---|
| 8,468,445 | B2* | 6/2013 | Gupta | G06F 17/30908 715/234 |
| 2005/0022115 | A1* | 1/2005 | Baumgartner | G06F 17/30867 715/205 |
| 2009/0083200 | A1* | 3/2009 | Pollara | G06N 99/005 706/14 |
| 2010/0169299 | A1* | 7/2010 | Pollara | G06F 17/277 707/708 |
| 2011/0185273 | A1 | 7/2011 | DaCosta et al. | |

OTHER PUBLICATIONS

AnHai Doan et al., "Information Extraction Challenges in Managing Unstructured Data", SIGMOD Record, Dec. 2008, pp. 14-20 (Year: 2008).*

Andrew McCallum, "Information Extraction: Distilling Structured Data from Unstructured Text", ACM Queue, Nov. 2005, pp. 48-57 (Year: 2005).*

Bin Liu et al., "Refining Information Extraction Rules using Data Provenance", IEEE, 2010, pp. 17-24 (Year: 2010).*

Li, Yunyao et al., "VINERy: A Visual IDE for Information Extraction", Proceedings of the VLDB Endowment, 2015, vol. 8, No. 12, 4 pages, 2015 VLDB Endowment.

Disclosed Anonymously, "Method and System for Providing a Visual Programming Environment for Information Extraction", An IP.com Prior Art Database Technical Disclosure, IP.com No. 000242314, Jul. 6, 2015, 4 pages, IP.com.

Gottlob, Georg et al., "The Lixto Data Extraction Project—Back and Forth between Theory and Practice", PODS 2004, Jun. 14-16, 2004, Paris, France, 12 pages, ACM Digital Library.

Baumgartner, Robert et al., "Visual Web Information Extraction with Lixto", Proceedings of the 27th VLDB Conference, 2001, Roma, Italy, 10 pages.

Ling Liu et al., "An XML-enabled data extraction toolkit for web sources", Information Systems, Nov. 2001, 21 pages, vol. 26, Issue 7, Elsevier Publishing Company, Amsterdam, Netherlands.

* cited by examiner

507

```
<output spec>
    <field name="person"/>
    <field name="phone" output-concept-name="Phonenumber"
        output-model-name="personPhone"/>
    <field name="personPhone" hide="no" func-call="yes">
        <function-call func-name="CombineSpans">
            <arg>
                <string-node value="IgnoreOrder" />
            </arg>
            <arg>
                <field-spec input-field-name="person"
                    input-concept-name="Person" input-concept-module="personPhone" />
            </arg>
            <arg>
                <field-spec input-field-name="phone"
                    input-concept-name="Phone" input-concept-module="personPhone" />
            </arg>
        <function-call>
    </field>
</output-spec>
    <rule-spec>
        <concept-projection />
    </rule-spec>
    <inclusive-predicates>
        <predicate>
            <function-call func-name="FollowsTak">
                <arg>
                    <field-spec input-field-name="person"
                        input-concept-name="Person" input-concept-module="personPhone" />
                </arg>
                <arg>
                    <field-spec input-field-name="phone"
                        input-concept-name="Phone" input-concept-module="personPhone" />
                </arg>
                <arg>
                    <int-node value="0" />
                </arg>
                <arg>
                    <int-node value="5" />
                </arg>
            </function-call>
        <predicate>
    <inclusive-predicates>
    <consolidation-spec target="personPhone" policy="NotContainedWithin" />
</concept>
```

```
-- Costly cross product between Person and Phone finding all permutations
-- and combinations of person, phone mentions
create view _PersonPhone as
  select P1.person, P2.phone,
    CombineSpans('IgnoreOrder', P1.person, P2.phone) as personPhone
  from Person P1, Phone P2;

-- Filtering on the costly cross product
create view PersonPhone as
  select P.person, P.phone, P.personPhone
  from _PersonPhone P
  where FollowsTak(P.person, P.phone, 0, 5);
```

649

```
-- Apply Filter on the cross product in the same view thus improving performance
create view _PersonPhone as
  select P1.person, P2.phone,
         CombineSpans('IgnoreOrder', P1.person, P2.phone) as personPhone
  from Person P1, Phone P2
  where FollowsTak(P1.person, P2.phone, 0, 5);
```

FIG. 6

TRANSLATION OF A VISUAL REPRESENTATION INTO AN EXECUTABLE INFORMATION EXTRACTION PROGRAM

CROSS REFERENCE TO RELATED APPLICATIONS

This application is a continuation application of U.S. patent application Ser. No. 15/006,985, filed on Jan. 26, 2016, and entitled "TRANSLATION OF A VISUAL REPRESENTATION INTO AN EXECUTABLE INFORMATION EXTRACTION PROGRAM," the contents of which are incorporated by reference herein.

BACKGROUND

Information Extraction (IE) is the operation (or process) of extracting structured information from unstructured (or semi-structured), machine readable text. It can be said to represent a basic building block, even a critical component, of many enterprise applications including regulatory compliance, social media analytics, and search routines. Such applications tend to require information extraction programs with very high accuracy and coverage. At least in such settings, building or developing an information extraction program (also referred to herein as an "extractor"), and associated rules, can involve an extremely labor intensive process.

Conventional web information extraction programs may permit the building of extractors visually. However, their construction tends to be limited to a specific type of extractor (e.g., a "wrapper"). Among other shortcomings, conventional arrangements lack the ability to translate a visual representation of an arbitrary complex concept into optimized executable and human-readable/executable extractors.

BRIEF SUMMARY

In summary, one aspect of the invention provides a method for generating an executable extraction program from a visual representation, the method comprising: utilizing at least one processor to execute computer code that performs the steps of: receiving input indicating at least one concept from at least one document of an input document collection; generating a validated data model representing an extractor for each of a plurality of concepts indicated from the received input, wherein each of the concepts is represented as a visual data structure comprising semantics associated with the visual data structure; generating at least one intermediate model object by parsing the validated data model, wherein each of the intermediate model objects comprises a concept object and wherein the at least one intermediate model object identifies concept dependencies; translating the at least one intermediate model object into executable source code, wherein the translating comprises importing at least one pre-built extractor having a dependency related to at least one of the plurality of concepts and translating at least one rule identified from the visual data structure; and generating an executable information extraction program from the executable source code, wherein the generating comprises generating at least one rule for the executable information extraction program based on the identified concept dependencies.

Another aspect of the invention provides an apparatus for generating an executable extraction program from a visual representation, the apparatus comprising: at least one processor; and a computer readable storage medium having computer readable program code embodied therewith and executable by the at least one processor, the computer readable program code comprising: computer readable program code that receives input indicating at least one concept from at least one document of an input document collection; computer readable program code that generates a validated data model representing an extractor for each of a plurality of concepts indicated from the received input, wherein each of the concepts is represented as a visual data structure comprising semantics associated with the visual data structure; computer readable program code that generates at least one intermediate model object by parsing the validated data model, wherein each of the intermediate model objects comprises a concept object and wherein the at least one intermediate model object identifies concept dependencies; computer readable program code that translates the at least one intermediate model object into executable source code, wherein the translating comprises importing at least one pre-built extractor having a dependency related to at least one of the plurality of concepts and translating at least one rule identified from the visual data structure; and computer readable program code that generates an executable information extraction program from the executable source code, wherein the generating comprises generating at least one rule for the executable information extraction program based on the identified concept dependencies.

A further aspect of the invention provides a computer program product for generating an executable extraction program from a visual representation, the computer program product comprising: a computer readable storage medium having computer readable program code embodied therewith, the computer readable program code comprising: computer readable program code that receives input indicating at least one concept from at least one document of an input document collection; computer readable program code that generates a validated data model representing an extractor for each of a plurality of concepts indicated from the received input, wherein each of the concepts is represented as a visual data structure comprising semantics associated with the visual data structure; computer readable program code that generates at least one intermediate model object by parsing the validated data model, wherein each of the intermediate model objects comprises a concept object and wherein the at least one intermediate model object identifies concept dependencies; computer readable program code that translates the at least one intermediate model object into executable source code, wherein the translating comprises importing at least one pre-built extractor having a dependency related to at least one of the plurality of concepts and translating at least one rule identified from the visual data structure; and computer readable program code that generates an executable information extraction program from the executable source code, wherein the generating comprises generating at least one rule for the executable information extraction program based on the identified concept dependencies.

An additional aspect of the invention provides a method for generating an executable extraction program from a visual representation, the method comprising: utilizing at least one processor to execute computer code that performs the steps of: receiving, from a user, input identifying at least one concept of interest; creating a validated model representing an extractor for each of a plurality of concepts indicated from the received input, wherein the validated model comprises a visual data structure representing each of the concepts and wherein the validated model captures extraction semantics identified within the visual data structure; generating at least one intermediate model object by parsing the validated model, wherein each of the intermediate model objects comprises a concept object and wherein the at least one intermediate model object identifies concept dependencies identified from the visual data structure; translating the at least one intermediate model object to executable source code by: identifying a rule defining the concept object, wherein the rule is identified from the visual data structure; generating an executable source code rule corresponding to the identified rule by translating the identified rule to executable source code; applying at least one filter to the executable source code rule; and creating, based upon the executable source code rule, executable source code representing the concept object, wherein the creating comprises applying at least one optimization rule during the creation of the executable source code; and generating an executable information extraction program from the executable source code.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 sets forth a sample input model for a process of IE code generation.

FIG. 6 sets forth a comparison of code produced via 1:1 translation, as opposed to code optimized in a manner as broadly contemplated herein.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 8. In accordance with an exemplary embodiment, most if not all of the process steps, components and outputs discussed with respect to FIGS. 1-6 can be performed or utilized by way of a processing unit or units and system memory such as those indicated, respectively, at 16' and 28' in FIG. 8, whether on a server computer, a client computer, a node computer in a distributed network, or any combination thereof.

Figure 1:
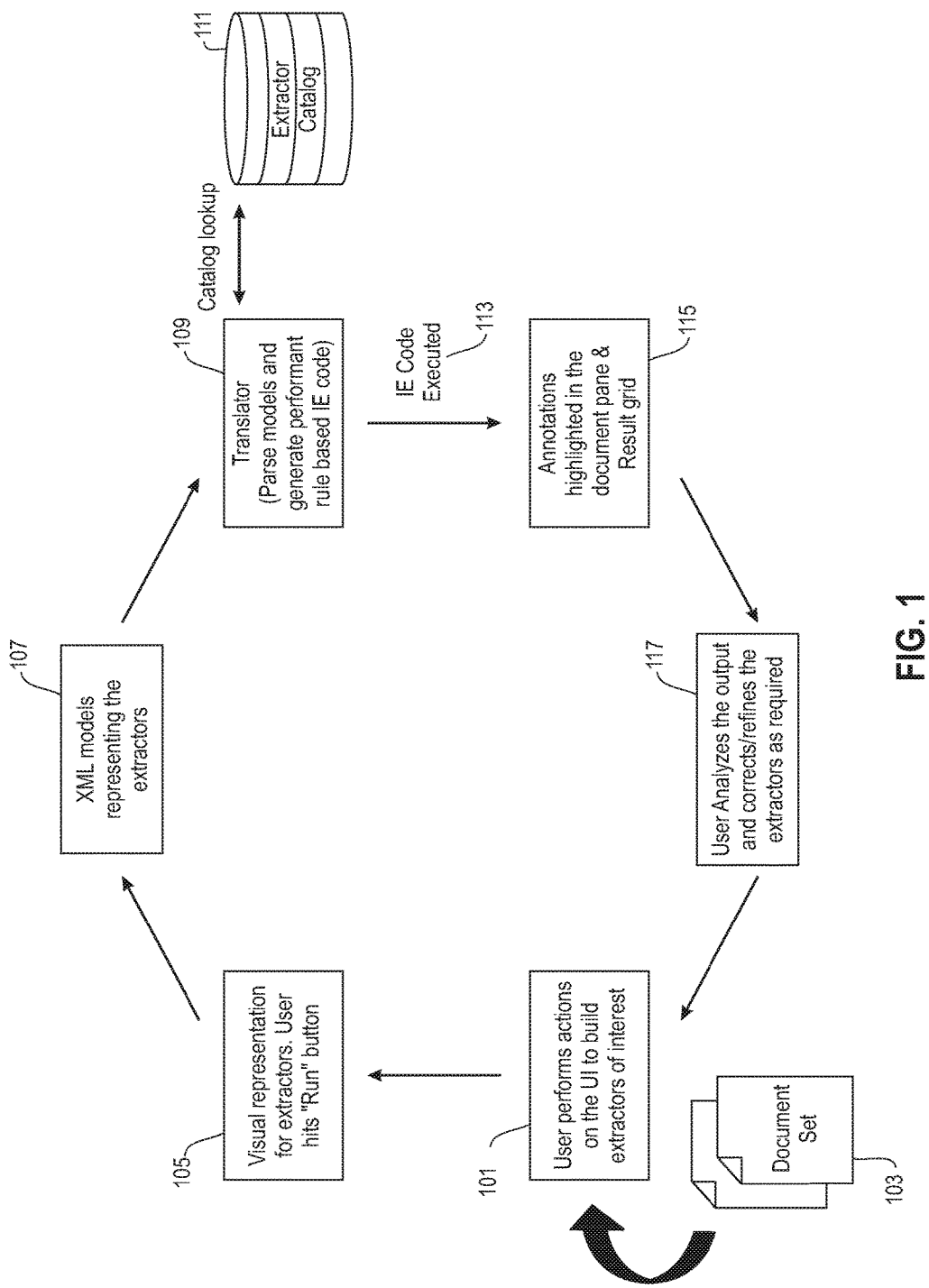
FIG. 1 schematically illustrates an overview of a visual information extraction (IE) process inside a sample system.

To facilitate easier reference, in advancing from FIG. 1 to and through FIG. 6 a reference numeral is advanced by a multiple of 100, indicating a substantially similar or analogous component or element with respect to at least one component or element found in at least one earlier figure among FIGS. 1-6.

In accordance with at least one embodiment are methods and arrangements for generating an executable extraction program ("extractor") from a visual representation. An embodiment may obtain a validated model comprising a plurality of concepts. The concepts may comprise semantics associated with a visual representation of an object. From the validated model, an embodiment may generate at least one intermediate model object comprising a concept object, by parsing the validated model. In one embodiment, the concept object may be represented in a data structure. If attributes of the concept objects are missing, one embodiment may provide default values for these attributes.

The intermediate model objects may then be translated into executable source code. In translating the model objects an embodiment may consult an extractor catalog which may be a repository containing information extraction code relating to the model objects. In other words, the extractor catalog may be a dictionary of sorts for information extraction code. In one embodiment the intermediate model object may be a node of a tree-like structure. For example, if an embodiment uses an XML, data structure, the object may be a node within the data structure. When translating such a node, an embodiment may translate the node into an executable source code node. To translate the model object, an embodiment may identify a rule defining the concept object and then generate a corresponding executable source code rule, which may represent a basic rule. An embodiment may then apply a filter to the executable source code rule and apply other functions to the basic rule to create the concept's final output.

The executable source code may then be used to generate an executable information extraction program, for example from the concepts' final output after filtering and applying rules has been completed. In one embodiment, before generating an executor, the executable source code may first be validated to ensure that the code is accurate and can be executed or that the code is as compact as possible. As an additional step, an embodiment may optimize the executable source code by applying optimization rules during the generation of the extractor. In one embodiment, in which the concept objects are represented in a data structure, generating an executable information extraction program may include translating a rule contained within the data structure into an information extraction language associated with the executable information extraction program.

Such systems and methods represent a technical improvement to existing extraction program creation techniques. For example, such systems as described herein assist a developer in creating an extraction program by capturing a visual representation of an extractor in a compact and concise abstraction. The visual representation may automatically be translated into an executable and human-readable and editable extraction program, which provides an extraction program that is easier to read and edit. A system may automatically identify and incorporate dependencies between the extraction program and any other existing extractors, which makes building a new extraction program easier and less time consuming because the developer does not have to ensure that all the dependencies are carried through the program. To generate a more optimized extractor, optimization techniques may be employed which provides an extractor that uses fewer resources and provides results more quickly than non-optimized extractors.

The features discussed above, and others, relating to at least one embodiment of the invention, will be better appreciated from the discussion which follows.

By way of general concepts, terms, and definitions that may be employed herein, in accordance with at least one embodiment of the invention, a concept or extractor can be regarded as a visual object with the concept name in it. An atomic concept can be of any of the following types: a pre-existing extractor (available out of the box); a regular expression; a dictionary (e.g., including a mapping table); a token gap; a literal. A composite concept can be a combination of any and all atomic concepts by way of algebraic operations (e.g., union, join, etc.). Each concept on the canvas may be, in one embodiment, represented as a data structure. In one embodiment, the data structure may be validated before translation to ensure that a correct information extraction program can be represented.

The translation of a concept (e.g., on a canvas) to an extractor (i.e., an executable information extraction program) may be performed via generating human-readable code that: imports any pre-built extractors for which any associated concept may have a dependency; translates rules specified in the data structure into the corresponding information extraction language to generate an extractor that is both human-consumable and efficient to execute; and generates rules for extractors that the current extractor depends on based on the visual composition of the corresponding concepts. Translation also may involve pre-processing, as well as post-processing (e.g., rewriting the translated extractor for better performance). These concepts, terms and definitions will be better understood and appreciated from the ensuing discussion.

Generally, in accordance with at least one embodiment of the invention, inasmuch as development of an extractor can represent a highly labor-intensive task, there are broadly contemplated herein methods and arrangements which assist a developer by permitting: capturing of a visual representation of an extractor in a compact and concise abstraction; automatic translation of the visual representation into an executable and human-readable and editable extraction program; automatic identification and incorporation of dependencies among the extractor and any existing extractors; and application of an optimizer (or optimizing measure), if/when needed, to generate an even more optimized extractor.

In accordance with at least one embodiment of the invention, FIG. 1 schematically illustrates an overview of a visual information extraction process inside a sample system that may benefit from methods and arrangements broadly contemplated herein. Some general steps are outlined here, while further detail can be appreciated elsewhere herein. As shown, given an input document set (101), a user can interact with a user interface of a computer or other system and provide visual cues as input to the system for finding entities of interest from an input document collection. As such, the user may perform actions via the user interface (103) to build extractors, relative to the document set 101, determined to be of interest.

With the visual representation (e.g., set of visual cues) now constructed, the user may activate the system to perform the extractions (105). Responsive thereto, the system may transform these visual cues into one or more intermediate representations. In the example and FIG. 1, the intermediate representations may be XML, models representing the built extractors. However, other data models are possible and contemplated. The intermediate representations may be translated into information extraction code by a translator (109). The information extraction code may be code that allows the system to perform in an optimal manner. The translation of the intermediate representations may be completed by initially parsing the models. In one embodiment, the translation may also be assisted by consulting (via lookup) an extractor catalog 111. The translator 109 may also be referred to as an "information extraction code generator", as variously discussed herein.

In accordance with at least one embodiment of the invention, the information extraction (IE) code automatically generated by the translation process (109) may then be executed (113) by a specific target IE runtime engine. Such an execution may result in producing annotations on documents as per semantics of one or more underlying extractors. Additionally, in one embodiment, the annotations may be, for example, highlighted or identified in the document pane of a UI and in a resulting grid (115). The user may then analyze the output and correct or refine the extractors as needed (117) as part of a general iterative process toward finalizing the extractor. Thus, in such an iterative process, the user can once again perform actions to the build extractors (101) to restart the general process depicted in FIG. 1.

Figure 2:
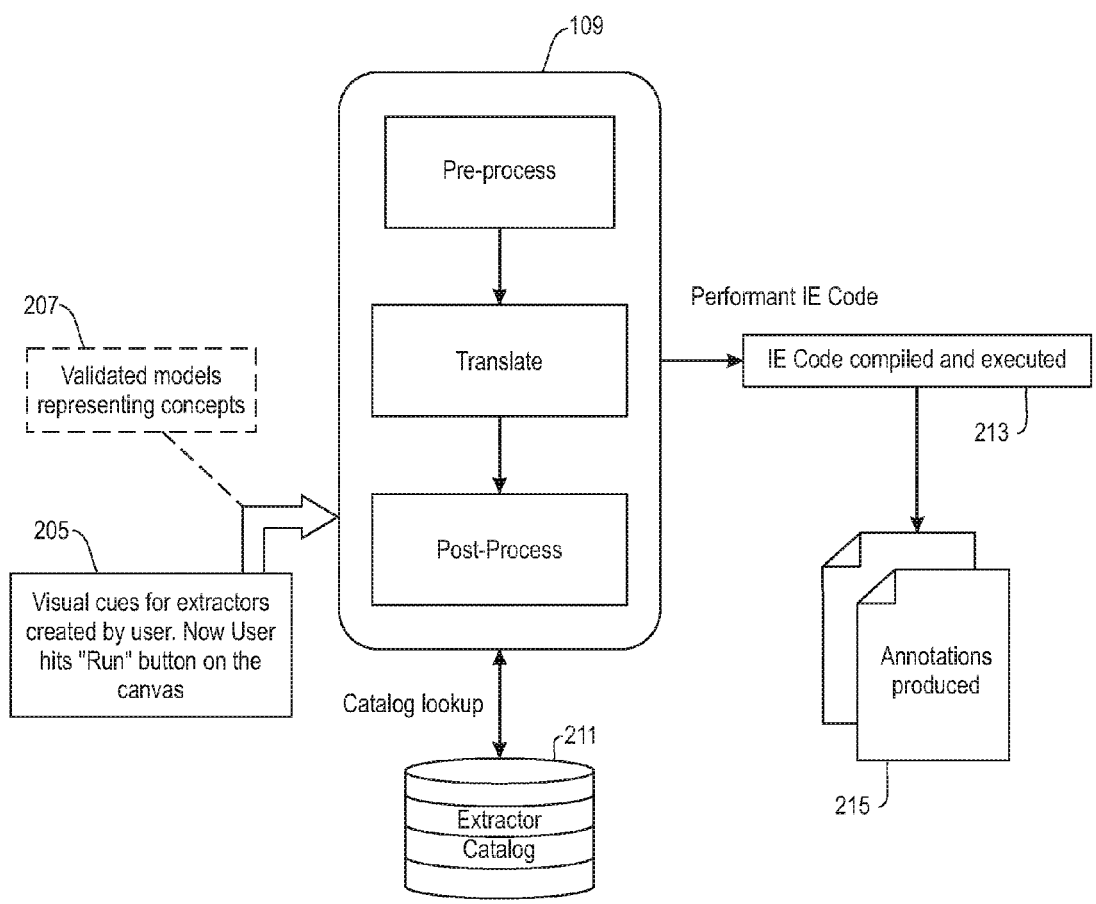
FIG. 2 schematically illustrates an overview of a translation process, and ancillary steps.

In accordance with at least one embodiment of the invention, FIG. 2 provides an overview of a translation process, and ancillary steps. To start, the user may create visual cues for previously built extractors and then activate the system (205). Using the cues, an embodiment may create an intermediate representation or model. Such a model may include a data model (e.g., XML, JSON, etc.) representing the extractor. The data model may capture the extraction semantics expressed by the visual/graphical representation. In other words, the model may capture the semantics of individual visual components, including a component's input and output, and the relationship of the components to each other.

The intermediate representation(s) or model(s) of the concepts may then be validated, for example as a validated model. A valid model may comprise a model that can be converted into a valid and executable extractor. In validating the model, an embodiment may match the model to a model schema which may indicate the expected relationships and semantics of the model. Additionally, the actual value included in the model needs to match the expected semantics for a valid information extraction program. The model schema may be based on and limited to the underlying IE language constructs (207). The IE code generator, alternatively termed the "translator" herein (209), may then translate the model into IE code which, again, may be assisted via consulting an extractor catalog (211). Translation (or IE code generation) involves pre-processing and post-processing that will be further elaborated upon here below. The IE code may be compiled and executed (213), e.g., via an IE runtime, to produce annotations over the input documents (215).

Figure 3:
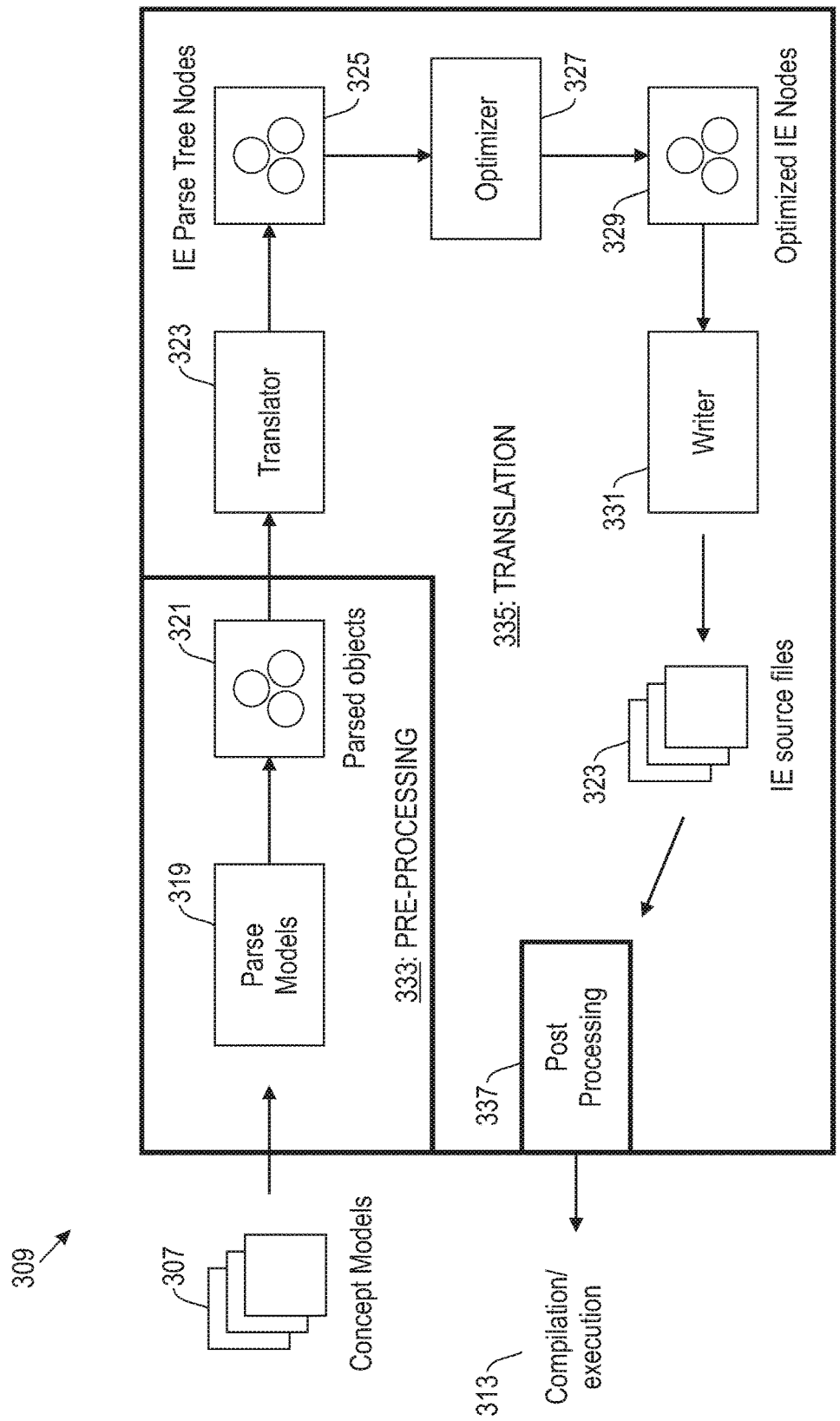
FIG. 3 schematically illustrates the architecture of an IE code generator.

In accordance with at least one embodiment of the invention, FIG. 3 schematically illustrates the architecture of an IE code generator (or translator) 309. As shown, validated concept models 307 may be parsed and preprocessed (319) into intermediate model objects (321). The intermediate model objects may include a concept object. Additionally the objects may be represented in a data structure. These objects may be translated, via what may be termed a "translator" (as an internal component) or "translation component" (323), into executable source code.

As an example, in one embodiment, the intermediate model objects may be represented in a tree-like structure having nodes. Each of the tree nodes may be translated into an executable source code node or IE parse tree nodes (325). This translation may be based on constructs of the target output IE language. An optimizer (327) may then be employed to generate optimized (most efficient) executable source code or an optimized set of IE tree nodes 329. Such optimization is discussed below in more detail. A writer module 331 may then translate the executable source code into an executable information extraction program or corresponding IE source code (or files) 323. This executable information extraction program may then be compiled and executed by the information extractor.

As such, in accordance with at least one embodiment of the invention, general "pre-processing" (333) may involve parsing the validated models 307, and corresponding concept model objects. In one embodiment, optional attributes of concept model objects, may be filled with default values if values are not otherwise provided. Folders may be set up for modules in which IE code files will be created. Dictionary files may also be created.

In accordance with at least one embodiment of the invention, an internal (general) "translation" process 335 may involve the aforementioned creation (323) of executable source code for the concept model objects (325). The optimizer (327) may then be invoked, to the extent necessary to rewrite executable source code into optimized source code (329). The optimized source code may be written (331) to files on a local file system in the aforementioned folders created during pre-processing 333 (and in the form of source files 323). In accordance with at least one embodiment of the invention, general "post-processing" 337 may involve validation of the generated IE code before sending the same for compilation/execution (313).

Figure 4:
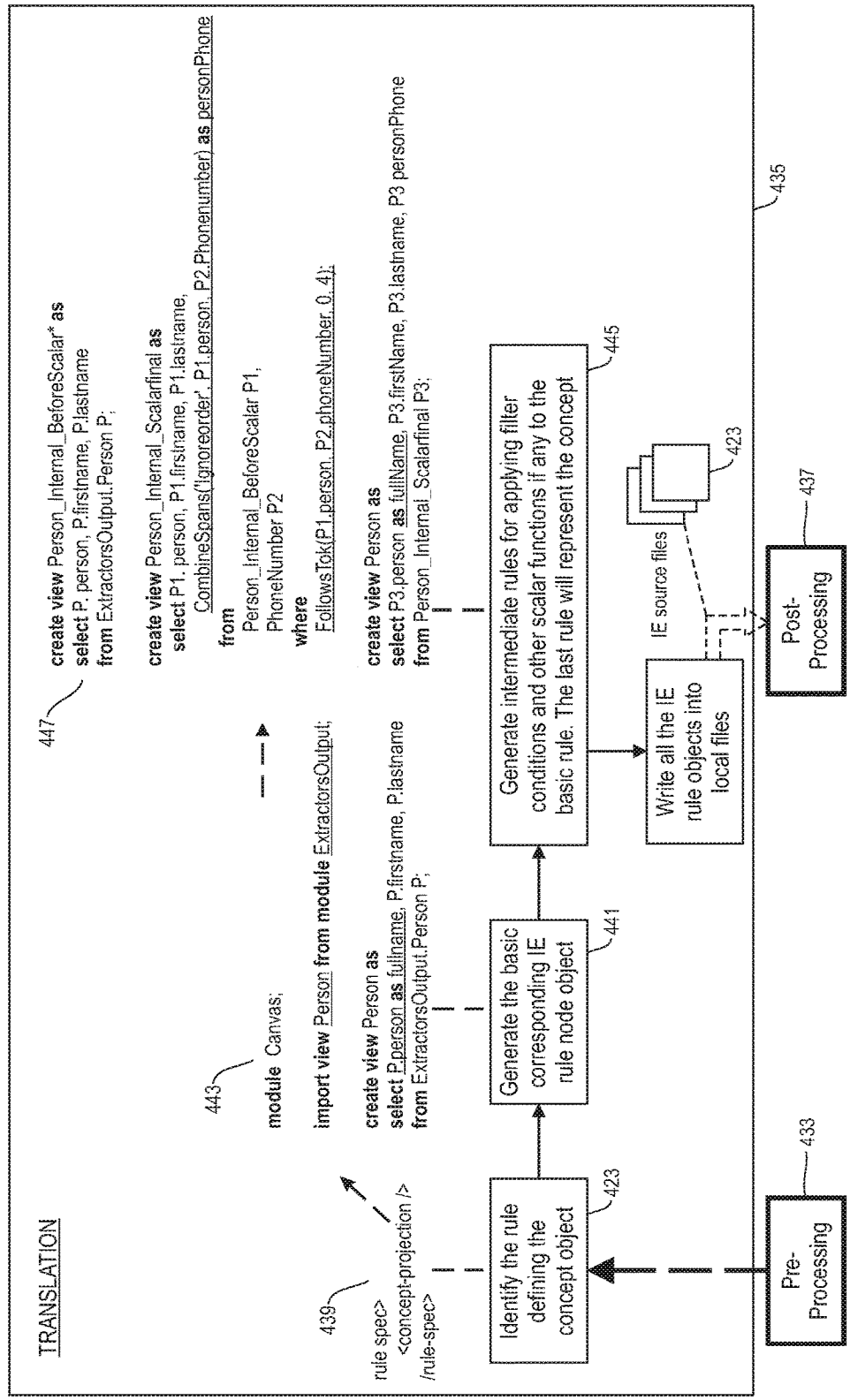
FIG. 4 schematically illustrates a working example of a translation component of a general process of IE code generation.

In accordance with at least one embodiment of the invention, FIG. 4 provides a working example of a translation component 435 of a general process 409 of IE code generation. Pre-processing 433 and post-processing 437 can be understood to be carried out in a manner consistent with analogous steps discussed above. In one embodiment, after pre-processing (433) the concept models may be translated into executable source code (423). To accomplish this translation, one embodiment identifies a base rule (for example, an IE language construct 439) that defines a concept from the model. The base rule may be an atomic concept rule or a composite concept rule. In the present example, it is a simple atomic concept rule of concept projection, i.e., a pre-existing extractor has been used and thus 1:1 mapping is involved between the model and the corresponding executable source code. In a subsequent step (441), a basic corresponding executable source code node (443) is generated via importing a pre-existing extractor view and applying a projection on top of the same. Then, the model may be parsed (445) to apply any refinement constructs on the base rule. For example, the working example of 447 illustrates the refined executable source and thus represents the concept's final output, for example, executable source code. In the process, intermediate rules are generated for applying filter conditions and other scalar functions, if any, to the basic rule. Finally, as discussed heretofore, all executable source code (e.g., IE source files 423) may be written into local files (331).

In accordance with at least one embodiment of the invention, the disclosure now turns to a general discussion of optimization (or "optimizing") as variously mentioned above. Generally, a model (e.g., a front-end XML model) might specify constructs that need to be translated into executable source code (e.g., AQL), but the model may not provide an "order" in which they need to be written, compiled, and executed. An optimization process thus attempts to determine an optimal order.

By way of an illustrative and non-restrictive example, in accordance with at least one embodiment of the invention, a model may specify that it simply aims to modify a "Person" concept to create a "PersonPhone" view which has a scalar function, a filter, and a consolidation policy. There is no order specified in the model for when consolidation has to be applied or when the predicates should be applied. It simply states that this inclusive predicate and consolidation policy need to be taken into account while constructing the executable source code for the concept. A sample input model (507) is set forth in FIG. 5.

In accordance with at least one embodiment of the invention, some optimizations may be performed on a model (507). By way of illustrative and non-restrictive example, optimizing may involve avoiding a cross-product. This can be undertaken by, for example, applying relevant inclusive predicates at the join step. Other methods for avoiding cross-product are possible. For example, using the model of FIG. 5, assume that it is desired to extract person-phone mentions from documents. The extraction can be done by extracting person mentions followed by phone mentions within 5 tokens from input documents. If Person and Phone concepts are ready on the "canvas", the user may then add a scalar function to the Person concept to obtain a combine span of Person and Phone entities. The user may then add a filter to Person to obtain a token constraint between Person and Phone. Finally, the user may apply a consolidation to the combine span of Person and Phone. Purely for illustrative purposes, FIG. 6 compares AQL code produced via a 1:1 translation, without any optimization (647), as opposed to code that is optimized in a manner as broadly contemplated herein (649).

In accordance with at least one embodiment of the invention, another method of optimization includes rewrite-based optimization, which may involve a push-down of predicates to individual views in a union all operation. Such a push-down of predicates may be similar to the standard SQL optimization done for union operations. Refining the views using filters before the union operation may lead to fewer tuples for union operation than applying the filters on top of a union all operation.

Another optimization measure may involve postponing consolidation. For instance, consolidation (handles overlapping matches) may be applied at the very end, recognizable as a good or best practice in AQL. Applying consolidation at the end will generally involve fewer tuples to consolidate than preceding views, because of refinements or filters that may already have been applied. Other consolidation methods are possible and contemplated.

Figure 7:
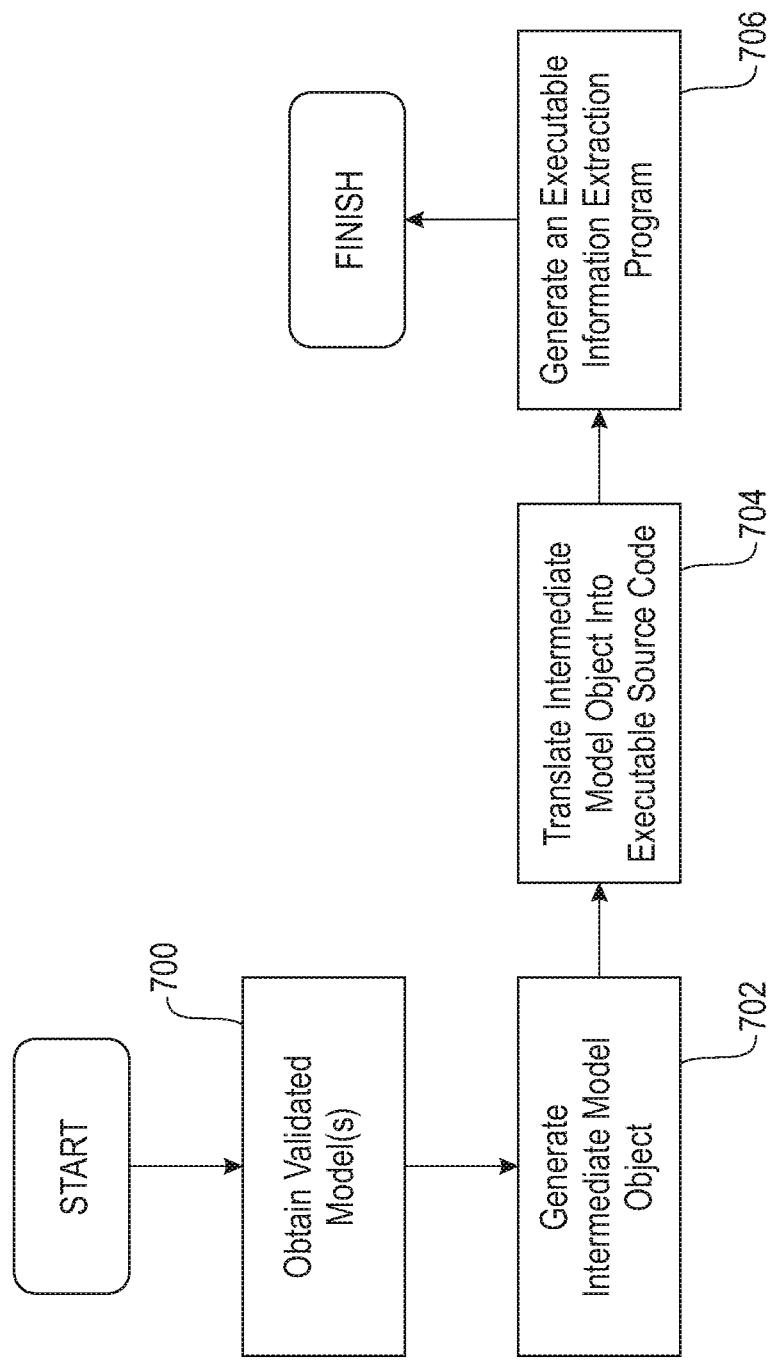
FIG. 7 sets forth a process more generally for producing executable information extractor code.

FIG. 7 sets forth a process more generally for producing executable information extractor code, in accordance with at least one embodiment of the invention. At 700 an embodiment may obtain a validated model comprising a plurality of concepts. The concepts may comprise semantics associated with a visual representation of an object. At 702 an embodiment may generate at least one intermediate model object by parsing the validated model. An intermediate model object may comprise a concept object. At 704 an embodiment may translate the at least one intermediate model object into executable source code. An embodiment may then, at 706, generate an executable information extraction program from the executable source code.

Figure 8:
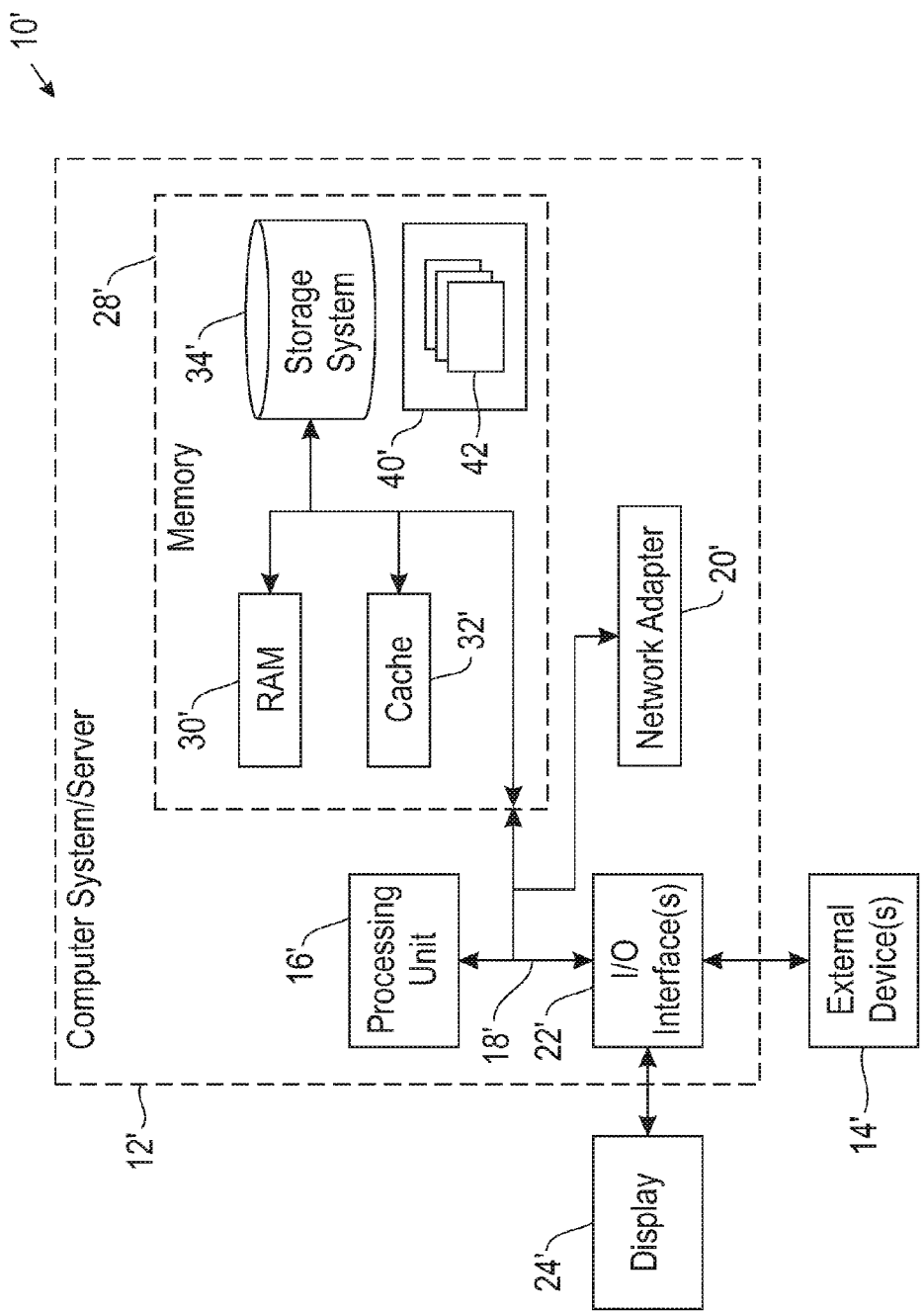
FIG. 8 illustrates a computer system.

It should be appreciated that a process such as that broadly illustrated in FIG. 7 can be carried out on essentially any suitable computer system or set of computer systems, which may, by way of an illustrative and non-restrictive example, include a system such as that indicated at 12' in FIG. 8. In accordance with an example embodiment, most if not all of the process steps discussed with respect to FIG. 7 can be performed by way of a processing unit or units and system memory such as those indicated, respectively, at 16' and 28' in FIG. 8.

Referring now to FIG. 8, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating an executable extraction program from a visual representation, the method comprising:
    utilizing at least one processor to execute computer code that performs the steps of:
    receiving input indicating at least one concept from at least one document of an input document collection;
    generating a validated data model representing an extractor for each of a plurality of concepts indicated from the received input, wherein each of the concepts is represented as a visual data structure comprising semantics associated with the visual data structure;
    generating at least one intermediate model object by parsing the validated data model, wherein each of the intermediate model objects comprises a concept object and wherein the at least one intermediate model object identifies concept dependencies;
    translating the at least one intermediate model object into executable source code, wherein the translating comprises importing at least one pre-built extractor having a dependency related to at least one of the plurality of concepts and translating at least one rule identified from the visual data structure; and
    generating an executable information extraction program from the executable source code, wherein the generating comprises generating at least one rule for the executable information extraction program based on the identified concept dependencies.

2. The method of claim 1, wherein the concept object is represented in a data structure.

3. The method of claim 2, wherein the generating an executable information extraction program comprises translating a rule contained within the data structure into an information extraction language of the executable information extraction program.

4. The method of claim 1, wherein the translating comprises consulting an extractor catalog.

5. The method of claim 1, comprising validating the executable source code.

6. The method of claim 1, wherein the at least one intermediate model object comprises a node of a tree-like structure.

7. The method of claim 6, wherein the translating comprises translating the node into an executable source code node.

8. The method of claim 1, wherein the translating comprises identifying a rule defining the concept object.

9. The method of claim 8, wherein the translating comprises generating an executable source code rule corresponding to the identified rule.

10. The method of claim 9, wherein the translating comprises applying at least one filter to the executable source code rule.

11. The method of claim 1, comprising providing default values for optional attributes of the concept object.

12. An apparatus for generating an executable extraction program from a visual representation, the apparatus comprising:
    at least one processor; and
    a computer readable storage medium having computer readable program code embodied therewith and executable by the at least one processor, the computer readable program code comprising:
    computer readable program code that receives input indicating at least one concept from at least one document of an input document collection;
    computer readable program code that generates a validated data model representing an extractor for each of a plurality of concepts indicated from the received input, wherein each of the concepts is represented as a visual data structure comprising semantics associated with the visual data structure;
    computer readable program code that generates at least one intermediate model object by parsing the validated data model, wherein each of the intermediate model objects comprises a concept object and wherein the at least one intermediate model object identifies concept dependencies;
    computer readable program code that translates the at least one intermediate model object into executable source code, wherein the translating comprises importing at least one pre-built extractor having a dependency related to at least one of the plurality of concepts and translating at least one rule identified from the visual data structure; and
    computer readable program code that generates an executable information extraction program from the executable source code, wherein the generating comprises generating at least one rule for the executable information extraction program based on the identified concept dependencies.

13. A computer program product for generating an executable extraction program from a visual representation, the computer program product comprising:
    a computer readable storage medium having computer readable program code embodied therewith, the computer readable program code comprising:
    computer readable program code that receives input indicating at least one concept from at least one document of an input document collection;
    computer readable program code that generates a validated data model representing an extractor for each of a plurality of concepts indicated from the received input, wherein each of the concepts is represented as a visual data structure comprising semantics associated with the visual data structure;

computer readable program code that generates at least one intermediate model object by parsing the validated data model, wherein each of the intermediate model objects comprises a concept object and wherein the at least one intermediate model object identifies concept dependencies;

computer readable program code that translates the at least one intermediate model object into executable source code, wherein the translating comprises importing at least one pre-built extractor having a dependency related to at least one of the plurality of concepts and translating at least one rule identified from the visual data structure; and computer readable program code that generates an executable information extraction program from the executable source code, wherein the generating comprises generating at least one rule for the executable information extraction program based on the identified concept dependencies.

14. The computer program product of claim 13, wherein the concept object is represented in a data structure.

15. The computer program product of claim 13, wherein the generating an executable information extraction program comprises translating a rule contained within the data structure into an information extraction language of the executable information extraction program.

16. The computer program product of claim 13, comprising validating the executable source code.

17. The computer program product of claim 13, wherein the at least one intermediate model object comprises a node of a tree-like structure and wherein the translating comprises translating the node into an executable source code node.

18. The computer program product of claim 13, wherein the translating comprises identifying a rule defining the concept object.

19. The computer program product of claim 18, wherein the translating comprises generating an executable source code rule corresponding to the identified rule and wherein the translating comprises applying at least one filter to the executable source code rule.

20. A method for generating an executable extraction program from a visual representation, the method comprising:

utilizing at least one processor to execute computer code that performs the steps of:

receiving, from a user, input identifying at least one concept of interest;

creating a validated model representing an extractor for each of a plurality of concepts indicated from the received input, wherein the validated model comprises a visual data structure representing each of the concepts and wherein the validated model captures extraction semantics identified within the visual data structure;

generating at least one intermediate model object by parsing the validated model, wherein each of the intermediate model objects comprises a concept object and wherein the at least one intermediate model object identifies concept dependencies identified from the visual data structure;

translating the at least one intermediate model object to executable source code by:

identifying a rule defining the concept object, wherein the rule is identified from the visual data structure;

generating an executable source code rule corresponding to the identified rule by translating the identified rule to executable source code;

applying at least one filter to the executable source code rule; and creating, based upon the executable source code rule, executable source code representing the concept object, wherein the creating comprises applying at least one optimization rule during the creation of the executable source code; and generating an executable information extraction program from the executable source code.

* * * * *